(No Model.)
M. L. HAYWARD.
WHIFFLETREE HOOK.
No. 548,874. Patented Oct. 29, 1895.
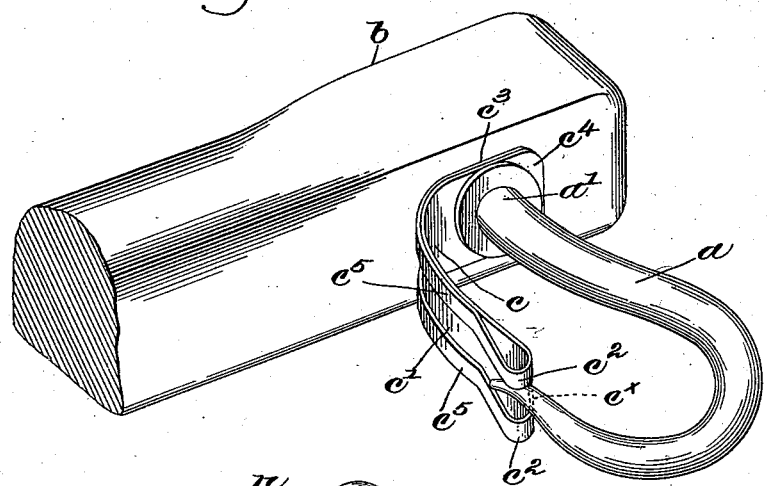
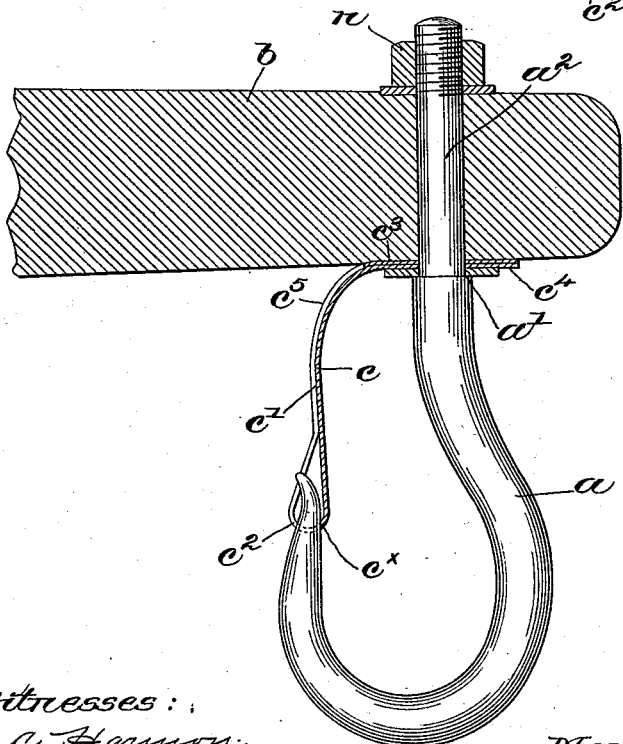
Witnesses:
A. C. Hammon
John F. C. Preinkert
Inventor:
Martin L. Hayward.
by Crosby & Gregory attys

UNITED STATES PATENT OFFICE.

MARTIN L. HAYWARD, OF NORTH READING, MASSACHUSETTS.

WHIFFLETREE-HOOK.

SPECIFICATION forming part of Letters Patent No. 548,874, dated October 29, 1895.

Application filed September 3, 1895. Serial No. 561,224. (No model.)

*To all whom it may concern:*

Be it known that I, MARTIN L. HAYWARD, of North Reading, county of Middlesex, State of Massachusetts, have invented an Improvement in Whiffletree-Hooks, of which the following description, in connection with the accompanying drawings, is a specification, like letters on the drawings representing like parts.

This invention has for its object the production of a novel hook particularly adapted for use as a whiffletree-hook, the construction of my novel hook being such that the trace, link, or other similar article attached thereto cannot be accidentally displaced.

In my invention the point of the hook is protected by a spring so constructed that a trace or other article may be brought into engagement with or disengaged from the hook without having to press the spring away from the hook by the thumb or fingers of the user.

Figure 1 is a perspective view of a trace-hook embodying my invention, and with a portion of the end of a whiffletree shown; and Fig. 2 is a sectional view taken through the central plane of the hook and its spring, the hook being shown in elevation.

The body of the hook $a$, reduced at $a'$ to form a shoulder and shank $a^2$, screw-threaded, is attached, as shown, to a whiffletree $b$ by passing the shank through a suitable hole therein and securing it in place by a nut $n$.

The body $a$ of the hook is bent but little to one side of the shank, as clearly shown in Fig. 2, to thereby avoid central draft—that is, the draft in the line of the shank.

I have found in practice that in central-draft trace-hooks a trace when hitched in the second or third hole will bear at its free end upon the base of the hook-body, and will be cramped and twisted or broken unless the hook is made with an unnecessarily long space between the shank and curved end of the hook.

In my "side-draft" hook, as I may term it, the end of the trace may ride up over the whiffletree, but it cannot become bent or twisted up in a short curve or at a sharp angle, for in usual hooks the bend of the hook and the whiffletree are quite far enough apart to permit this were it not for the interposition of the hook-shank or the body portion due to central draft.

The retaining-spring is composed of a strip of spring metal $c$, slotted for a portion of its length at $c'$ and bent over upon itself at $c^2$, the shank $a^2$ of the hook passing through the ends $c^3$ $c^4$ of the strip and retaining them rigidly between the shoulder $a'$ and the whiffletree. From its base the double spring thus formed is bent upward in a gradual curve and extends a short distance beyond the point of the hook, the bending of the spring upon itself at $c^2$ being located at the commencement $c^x$ of the slot $c'$, (see dotted lines, Fig. 1,) so that a projecting portion is formed at each side of the point and rounded, as clearly shown in Figs. 1 and 2. The spring at the end of the slot bears against the hook, and the bends $c^2$ prevent lateral displacement of the spring while covering the hook-point. The narrow portions $c^5$ of the spring at the sides of the slot $c'$ closely follow the curvature of the unslotted portion $c$ and somewhat reduce the rigidity of the spring. When the spring is bent back from the hook, however, to receive the trace or link, the outer portion tends to draw over or creep upon the inner portion, thus preventing the spring from falling away or back from the hook by constant use, which is an objection and annoyance to the usual spring or snap hooks. The rounded bends $c^2$ cannot cut or mar a trace or link, and the said bends are of such width at the sides of the hook that by turning the trace, link, or ring to one or the other side, as it is turned when inserted, so as to bear upon one of said bends, it may be readily withdrawn from the hook without pressing back the spring with the thumb or finger, as is now necessary.

I thus obtain a strong, simple, and efficient hook, to which a trace, link, &c., may be readily engaged or from which it may be as readily disengaged, and with a spring which will not fall down by constant use nor break at sharp angular bends.

My invention is not restricted to the exact construction shown, as the same may be modified in various particulars. For instance, the slot may be shortened from the end $c^x$ to only provide for the formation of the hook-engaging bends, thereby increasing the rigidity of the spring, or the spring herein shown may, if desired, be applied to a central draft-hook with equal facility.

I claim—

1. A hook provided at its base with an attaching shank, and an upturned spring secured at one end to the hook-shank, the upper end of the spring being turned over upon itself and slotted to form two bends to inclose the hook point and provide a hook engaging portion between them, substantially as described.

2. A hook provided at its base with an attaching shank, and a double spring secured at one end to the hook shank and curved upwardly to engage the inner side of the hook point, said spring being composed of a metal strip longitudinally slotted for a portion of its length and bent over upon itself adjacent the upper end of the slot, the hook point engaging the end of the slot and the bends at the sides thereof preventing lateral displacement of the spring, substantially as described.

3. In a whiffletree hook, the hook proper provided with an attaching shank to pass through the whiffletree, and a spring bent over upon itself and slotted in its outer portion from the bend, to thereby normally rest against the inner side of the hook point, the bends adjacent the end of the slot embracing the hook point and preventing lateral displacement of the spring, the ends of the spring being held in place by the shank of the hook, substantially as described.

4. A whiffletree hook having a body portion, a shank offset at one side of the line of draft, and a double spring secured at its lower end to the shank and curved upwardly to the hook point, the outer side of the spring being slotted from the hook engaging portion to leave two bends, one at each side of the point to prevent lateral displacement of the spring, flexure of the spring causing the outer portion to draw over the inner portion thereof, substantially as described.

In testimony whereof I have signed my name to this specification in the presence of two subscribing witnesses.

MARTIN L. HAYWARD.

Witnesses:
FREDERICK L. EMERY,
THOMAS J DRUMMOND.